(12) United States Patent
Lee

(10) Patent No.: US 7,388,642 B2
(45) Date of Patent: Jun. 17, 2008

(54) SEAL PATTERN FOR LIQUID CRYSTAL DISPLAY DEVICE AND FORMING METHOD THEREOF

(75) Inventor: Su-Woong Lee, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 197 days.

(21) Appl. No.: 09/995,665

(22) Filed: Nov. 29, 2001

(65) Prior Publication Data

US 2002/0063837 A1 May 30, 2002

(30) Foreign Application Priority Data

Nov. 30, 2000 (KR) ............................... 2000-72058

(51) Int. Cl.
*G02K 1/1339* (2006.01)
*G02K 1/1333* (2006.01)
(52) U.S. Cl. ..................... 349/153; 349/154; 349/155; 349/156; 349/157; 349/158
(58) Field of Classification Search ........ 349/153–158, 349/73, 74
See application file for complete search history.

(56) References Cited

U.S. PATENT DOCUMENTS

| | | | | |
|---|---|---|---|---|
| 5,517,344 A | * | 5/1996 | Hu et al. ..................... | 349/153 |
| 5,766,493 A | | 6/1998 | Shin ............................ | 216/23 |
| 5,835,176 A | | 11/1998 | Jeong et al. ................. | 349/124 |
| 6,197,209 B1 | | 3/2001 | Shin et al. .................... | 216/84 |
| 6,392,354 B1 | * | 5/2002 | Matsueda ................ | 315/169.1 |

FOREIGN PATENT DOCUMENTS

| | | | |
|---|---|---|---|
| JP | 61-45225 | * | 3/1986 |
| JP | 02-138459 | | 5/1990 |
| JP | 03-022390 | | 1/1991 |
| JP | 04-116619 | | 4/1992 |
| JP | 05-249422 | | 9/1993 |
| JP | 05-249423 | | 9/1993 |
| JP | 07-168172 | | 7/1995 |
| JP | 09-138417 | | 5/1997 |

* cited by examiner

*Primary Examiner*—Jerome Jackson
*Assistant Examiner*—Joseph Nguyen
(74) *Attorney, Agent, or Firm*—McKenna Long & Aldridge LLP

(57) ABSTRACT

After the attachment process, a substrate etching process, in which the outer surfaces of the upper and lower substrates are etched to reduce the thickness of the substrates, is performed according to the desired lightening of the substrate. However, since a main seal pattern can be damaged during the substrate etching process, a method of preventing the damage, in which a sub-seal pattern is formed, is suggested. However, if a plurality of unit liquid crystal cells is formed on one substrate, deterioration resulting from a low margin for the sub-seal patterns can occur so that a yield is decreased. In an embodiment according to the present invention, damage of the main seal pattern from the etching solution during the substrate etching process is prevented by the formation of the sub-seal patterns in the exterior of the main seal pattern, and air of the cell interior are easily vented due to the air vent portion having a proper seal pattern for ventilation. Therefore, the yields of the unit liquid crystal cells are increased.

20 Claims, 4 Drawing Sheets

SEAL PATTERN FOR LIQUID CRYSTAL DISPLAY DEVICE AND FORMING METHOD THEREOF

This application claims the benefit of Korean Patent Application No. 2000-72058, filed on Nov. 30, 2000, which is hereby incorporated by reference as if fully set forth herein.

BACKGROUND OF THE INVENTION

1. Field of the Invention

The present invention relates to a liquid crystal display device and fabrication method thereof, and more particularly to a seal pattern of a liquid crystal display device and fabrication method thereof.

2. Discussion of the Related Art

A liquid crystal display (LCD) device is an apparatus that displays images according to a change of a transmittance. Two substrates are disposed having electrodes in such a way that the surfaces of the electrodes face each other. A liquid crystal layer is interposed therebetween and the liquid crystal molecules are aligned by an electric field generated from a voltage between the electrodes. The LCD device is fabricated by the processes of forming a lower substrate, referred to as an array substrate, having thin film transistors (TFTs) and pixel electrodes; forming an upper substrate, referred to as a color filter substrate, having common electrodes and color filters; forming a liquid crystal cell by aligning and attaching the substrates; injecting the liquid crystal materials; and sealing and attaching a polarization film.

In a conventional LCD device, since a plurality of liquid crystal cells are simultaneously formed on a wide area substrate, a process of cutting the substrate into the unit liquid crystal cells is needed after an assembly process.

FIG. 1 is a flow chart illustrating a fabrication process of a conventional liquid crystal cell for an LCD device.

At step ST1, the lower and upper substrates are formed that include TFTs and color filters, respectively. The lower substrate is formed by repeating deposition and patterning steps of a thin film and several masks. Recently, a fabrication process that reduces cost by decreasing the number of masks has been investigated. The upper substrate is formed by subsequently making a black matrix, red (R)/green (G)/blue (B) color filters and a common electrode. The black matrix distinguishes the color filters and prevents light leakage of a non-pixel area. The color filter can be formed by a dyeing method, a printing method, a pigment dispersion method or an electro-deposition method; the pigment dispersion method is most widely employed.

At step ST2, an orientation film that determines an initial orientation of the liquid crystal layer is formed on the upper and lower substrates. This step includes deposition and alignment of a polymeric thin film along a specific direction. An organic material of the polyimide series is mainly used as the orientation film and a rubbing method is mainly used as the aligning method of the orientation film, respectively. The rubbing method consists of rubbing the orientation film along the specific direction by a rubbing cloth, and has advantages such as easy orientation treatment, suitability to mass production, high stability of the orientation and easy controllability of a pre-tilt angle.

At step ST3, a seal pattern that forms a gap for liquid crystal material injection and prevents leakage of the liquid crystal material is formed on one substrate. The seal patterning process involves forming a desired pattern by application of a thermosetting plastic. A screen print method using a screen mask and a seal dispenser method using a dispenser are used for the seal patterning process. For the simplicity of fabrication, the screen print method has mainly been used. However, since the screen mask is not suitable for a wide substrate and a contamination by contact between the mask and the orientation film often occurs, use of the seal dispenser method has gradually increased.

At step ST4, a spacer having a specific size to maintain a precise and uniform gap between the upper and lower substrates is deposited by spraying the spacer onto one of the upper and lower substrates. The spacer spray method can be divided into two different types: a wet spray method that involves spraying a mixture of alcohol and spacer material and a dry spray method that involves spraying spacer material alone. Furthermore, the dry spray method can be sub-divided into two different types: an electrostatic spray method that uses electrostatic force, and a non-electric spray method that uses gas pressure. Since the liquid crystal cell structure is susceptible to damage from static electricity, the non-electric method is mainly used.

At step ST5, the upper and lower substrates are attached by pressure-resistant hardening of the seal pattern.

At step ST6, the attached liquid crystal substrate is divided into unit cells. A cell cutting process includes a scribe process that forms cutting lines on a surface of the substrate using a diamond pen, a hardness of which is higher than a hardness of the glass substrate, and a break process that divides the unit cells by force.

At step ST7, a liquid crystal material is injected into the unit cells. A vacuum injection method using pressure difference between the inside and outside of the unit cells is commonly used as an effective injection method. Since fine air bubbles included in the liquid crystal material can deteriorate the display property of the unit cells, a bubble-eliminating process, in which the cells are kept in a vacuum state for a long period of time, is required.

After finishing the liquid crystal material injection, an injection hole is sealed to prevent leakage of the liquid crystal material. Generally, a ultra violet (UV) curable resin is deposited onto the injection hole by use of a dispenser and then ultra violet light is irradiated on the resin, thereby hardening the resin and sealing the injection hole. Polarization films are attached on outer surfaces of the unit cell and a driving circuit is connected to the unit cell using an attachment process. After the attachment process, a substrate etching process, in which the outer surfaces of the upper and lower substrates are etched to reduce the thickness of the substrates, is performed according to the desired lightening of the substrate.

FIG. 2 is a flow chart illustrating the substrate etching process.

At step ST8, impurities made during the previous processes are eliminated. If there are impurities on the outer surfaces of the attached substrates, etching deterioration such as an under-etching in the vicinity of the impurities occurs and the surfaces of the substrates become rough. Accordingly, since a diffused reflection or a refraction of the light can occur, the impurities are eliminated with a cleaning solution such as isopropyl alcohol (IPA) or deionized water (DI).

At step ST9, the attached substrates are etched. Generally, a glass substrate is used for the liquid crystal substrate and about 60% of the substrate comprises silicon dioxide ($SiO_2$). Therefore, the substrate can be etched with a solution of hydrofluoric (HF) acid, for example, a diluted solution with about 15% concentration, which is an etching solution for $SiO_2$.

At step ST10 and ST11, a residue of the HF solution is removed and the substrates are dried.

However, since a seal pattern can be damaged during the substrate etching process, a method of preventing the damage by forming a dual seal pattern is suggested.

FIG. 3 is a plan view of a seal pattern for 6, 13.3-inch unit cells in the glass substrate having an area of 590×670 mm².

As shown, 6 unit cells, "A, B, C, D, E and F" are formed on the substrate 10. Each unit cell has a main seal pattern 21 and an injection hole 22 is formed at the lower center of each main seal pattern 21. Furthermore, first, second and third sub-seal patterns 31, 32 and 33 are formed at the outer side of the main seal patterns 21 and surrounding the main seal pattern 21 of each unit cell. The sub-seal patterns 31, 32 and 33 not only have the function of protecting the main seal pattern 21 from the etching solution but also have the function of venting air between the upper and lower substrates during the attachment process. In the case of the open sub-seal patterns 31, 32 and 33 having an open portion to vent the air with ease, the permeated etching solution can cause damage to the main seal pattern 21, for example, a corrosion of pads or a substrate damage. In contrast, in the case of the closed sub-seal patterns 31, 32 and 33 without the open portion to protect the main seal pattern 21 from the etching solution, deterioration can occur, for example, light leakage or a low display quality owing to the lack of the liquid crystal material injection. Therefore, the sub-seal patterns 31, 32 and 33 are formed to have a structure to improve the above drawbacks. However, if a plurality of unit liquid crystal cells are formed on one substrate shown in FIG. 3, deterioration resulting from a low margin of the sub-seal patterns 31, 32 and 33 can occur so that a yield is only about 60% to 70%.

SUMMARY OF THE INVENTION

Accordingly, the present invention is directed to a seal pattern for a liquid crystal display device and manufacturing method thereof that substantially obviates one or more of problems due to limitations and disadvantages of the related art.

An object of the present invention is to provide a seal pattern for a liquid crystal display device and a manufacturing method thereof that has a high yield.

Another object of the present invention is to provide a seal pattern structure for a liquid crystal display device that can prevent the seal pattern from being damaged by ventilation of air from the interior of the cell.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a seal pattern of a liquid crystal display device includes: a substrate having a plurality of unit cell regions; a plurality of main seal patterns on the substrate, each main seal pattern is disposed at a boundary of the corresponding unit cell region except for one unit cell region, which is disposed at a central region of a substrate; and a first sub-seal pattern surrounding the main seal patterns and having an open portion and a plurality of seal patterns for air ventilation, wherein the open portion is formed at a region having no main seal pattern, and the seal patterns for air ventilation are formed at the open portion.

In another aspect of the present invention, a method of forming a seal pattern of liquid crystal display device includes: preparing a substrate having a plurality of unit cell regions; forming a plurality of main seal patterns on the substrate, wherein each main seal pattern is disposed at a boundary of the corresponding unit cell region except for one unit cell region disposed at a central region of the substrate; and forming a first sub-seal pattern surrounding the main seal patterns, and having an open portion and a plurality of seal patterns for air ventilation, wherein the open portion is formed at the region having no main seal pattern and the seal patterns for air ventilation are formed at the open portion.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE PREFERRED EMBODIMENTS

Reference will now be made in detail to the embodiments of the present invention, examples of which are illustrated in the accompanying drawings. Wherever possible, the same reference numbers will be used throughout the drawings to refer to the same or like parts.

Figure 1:
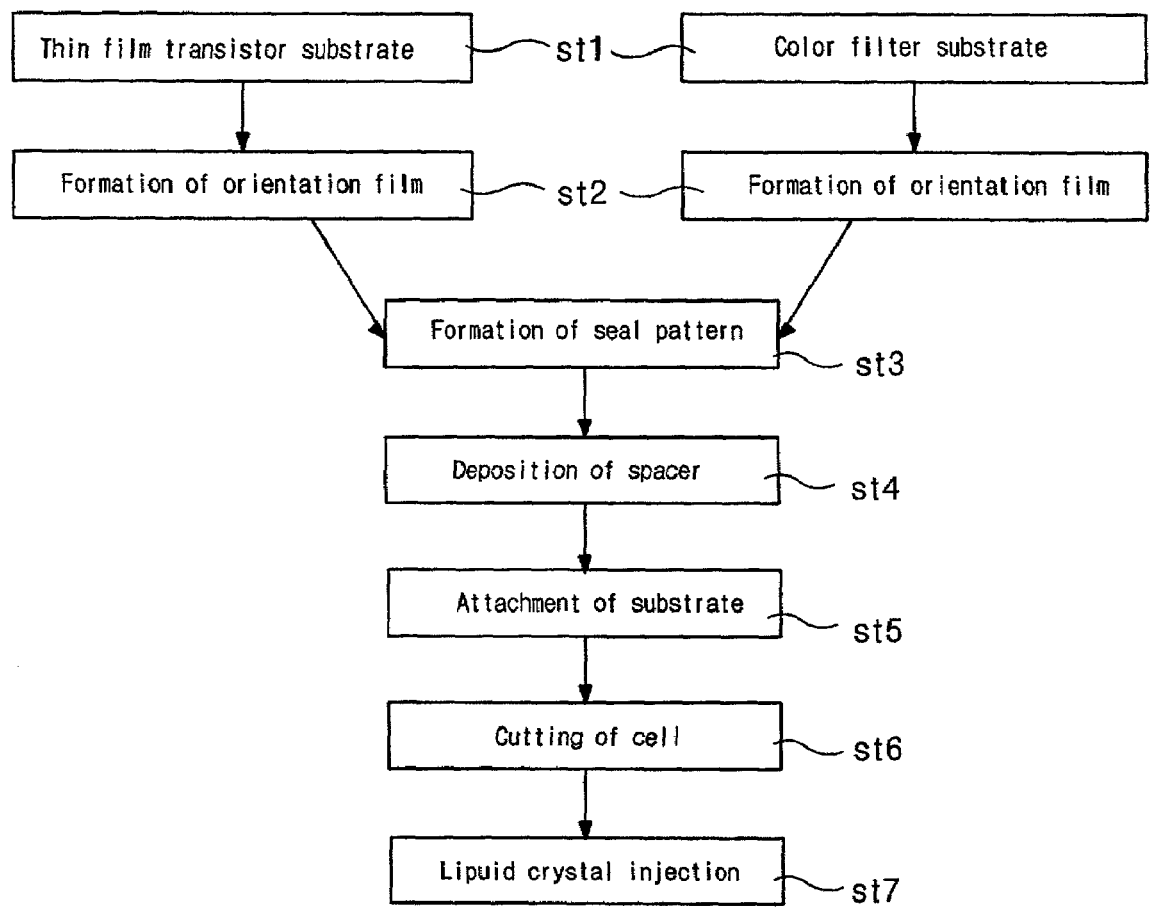
FIG. 1 is a schematic flow chart illustrating a conventional fabrication process of a liquid crystal cell for a liquid crystal display device.
Figure 2:
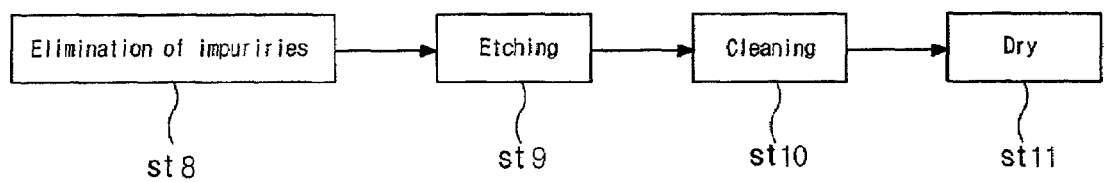
FIG. 2 is a schematic flow chart illustrating a conventional etching process of an attached liquid crystal substrate.
Figure 3:
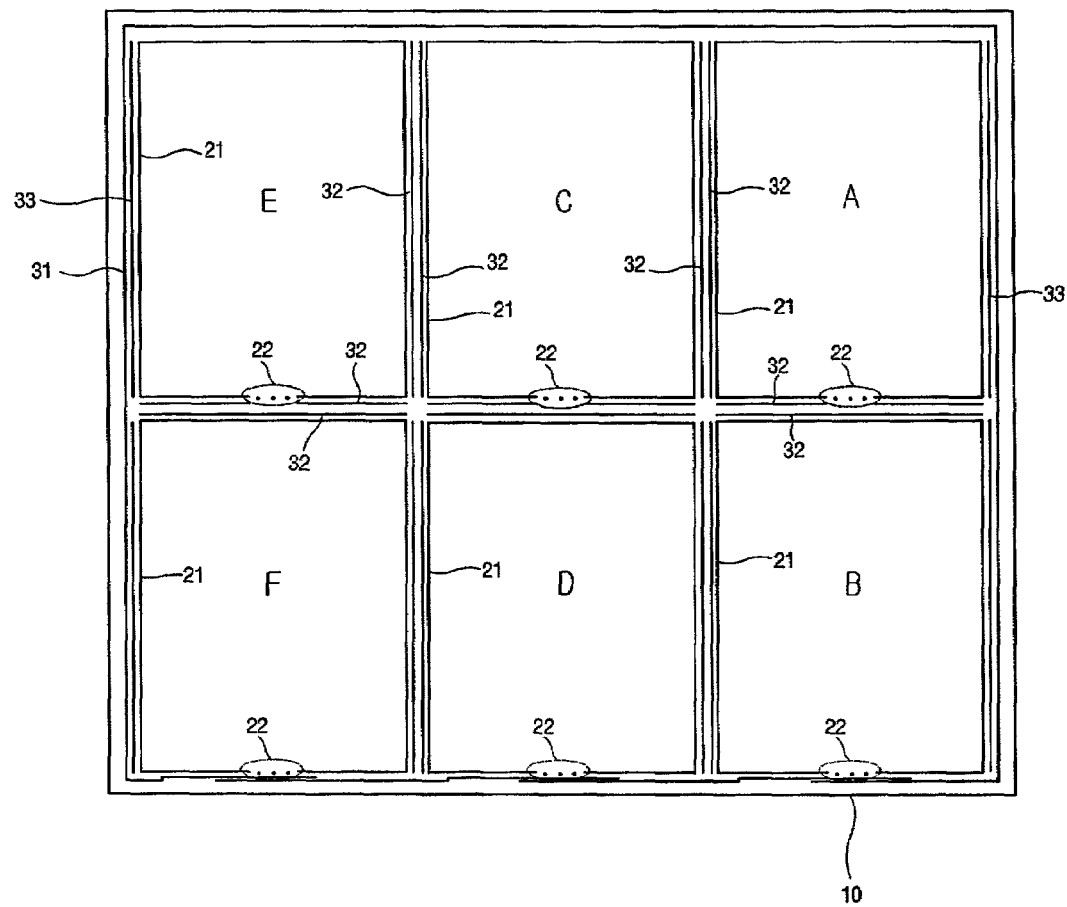
FIG. 3 is a schematic plan view of a conventional seal pattern for a liquid crystal display device.
Figure 4:
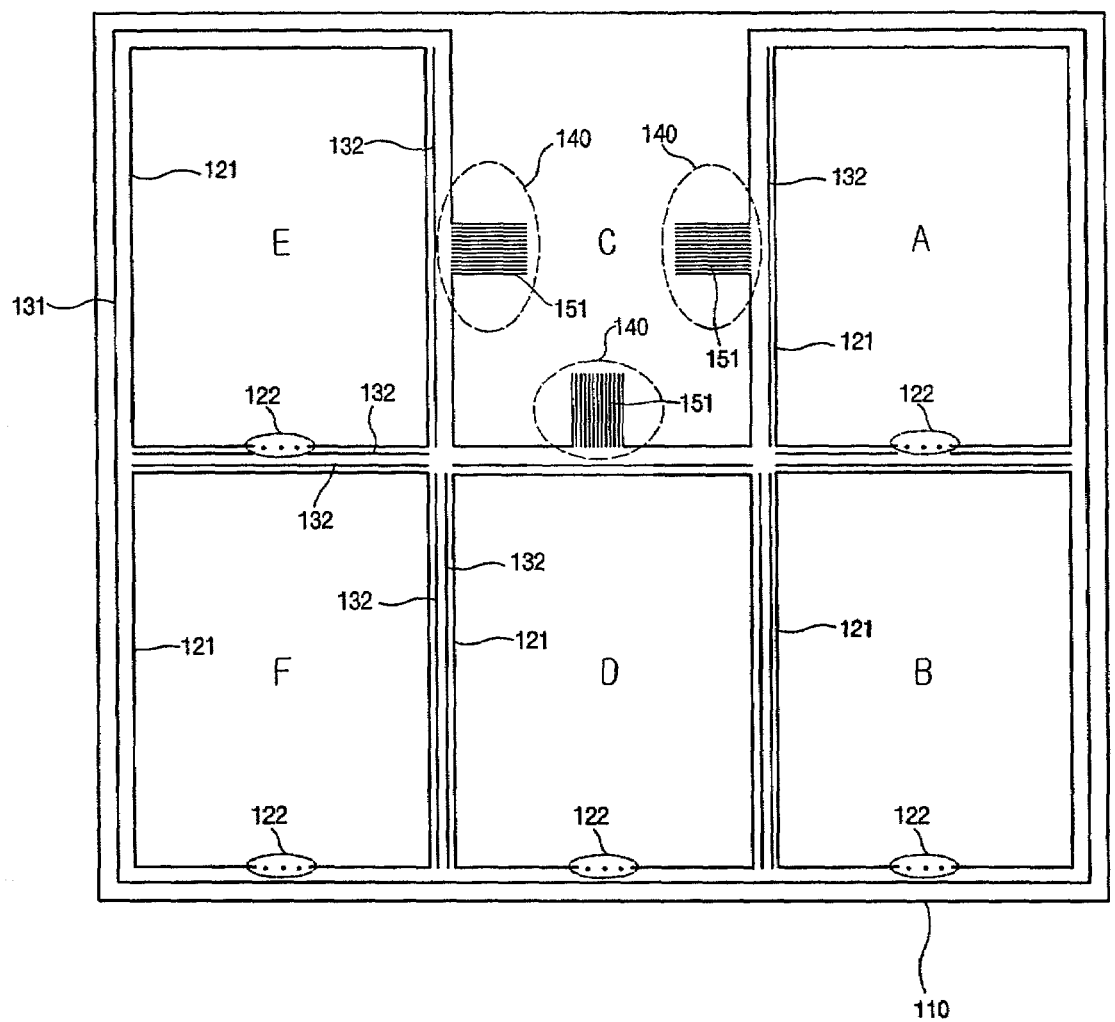
FIG. 4 is a schematic plan view of a seal pattern for a liquid crystal display device according to an embodiment of the present invention.

FIG. 4 is a schematic plan view of a seal pattern for a liquid crystal display device according to an embodiment of the present invention.

To form 13.3-inch unit cells on a glass substrate 110 having an area of 590×670 mm², the substrate 10 is divided into 6 regions "A, B, C, D, E and F". The unit cell regions are arranged with a plurality of columns or a plurality of rows. Each region except for the upper central region "C" has a main seal pattern 121 and an injection hole 122 is formed at the lower center of each main seal pattern 121. The main seal pattern 121 maintains a gap for the liquid crystal material injection and prevents leakage of the injected liquid crystal material. Furthermore, first and second sub-seal patterns 131 and 132 are formed at the outer side of the main seal patterns 121 to prevent the main seal pattern 121 from being damaged by an etching solution and the first sub-seal pattern 131 is closed except for air vent portions 140 at the region "C". The main seal pattern 121 is formed at a boundary of columns or a boundary of rows.

Since the sub-seal patterns 131 and 132 not only protect the main seal pattern 121 from the etching solution but also vent air between the upper and lower substrates during the attachment process, the first sub-seal pattern 131 has the air vent portion 140 at the region "C". A plurality of seal patterns 151 for air ventilation is formed at the air vent portion 140. If a width of the seal patterns 151 for air ventilation is too narrow, the air ventilation is not enough. In contrast, if the width of the seal patterns 151 for air ventilation is wide, the etching solution permeates into the cell interior. Therefore, the seal patterns 151 for air ventilation is formed with a width of about 1.5 to 2 mm. Moreover, a length of the seal pattern 151 for air ventilation is about 70 to 100 mm so that the etching solution cannot permeate into the cell interior. The air vent portions 140 are disposed on at least the inner three sides of the region "C" for easy air ventilation and difficult permeation of the etching solution, and a total width of the air ventilation is about 20 to 40 mm.

In this embodiment, even though the air vent portions 140 are formed at the region "C", the air vent portions 140 can be formed at the region "D" in another embodiment. Furthermore, the number of the air vent portions 140 can be changed. In the substrate having this seal pattern structure, since the etching solution can permeate into the air vent portions 140, but cannot reach the main seal patterns 121 of the unit cells, the deterioration of the main seal patterns 121 that results from the etching solution permeation can be prevented and five good unit liquid crystal cells can be acquired so that the yield becomes about 83.3%. The seal pattern of this embodiment can also be applied to unit liquid crystal cells having a different size with the size of the seal patterns varying accordingly.

Figure 5:
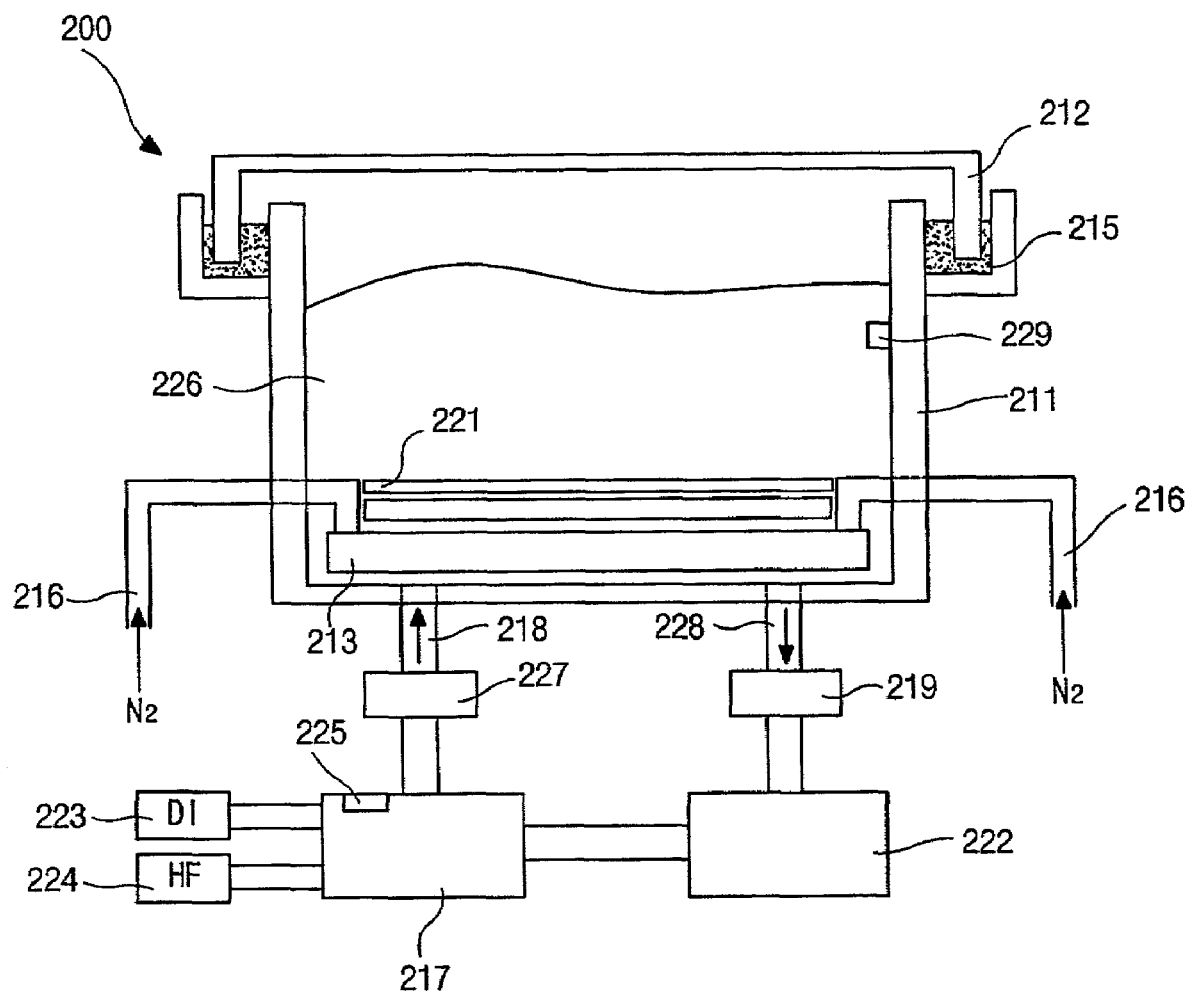
FIG. 5 is a schematic cross-sectional view of an etching apparatus for an attached substrate according to an embodiment of the present invention.

FIG. 5 is a schematic cross-sectional view of an etching apparatus for an attached substrate according to an embodiment of the present invention.

The etching apparatus 200 is composed of a bath 211, a cover 212 covering the bath 211 and a bubble plate 213 disposed in the bath 211. The bath 211 and the cover 212 are sealed with a water sealant 215. Air-supplying lines 216, through which nitrogen ($N_2$) or oxygen ($O_2$) are supplied from a gas tank (not shown), are connected to the right and left sides of the bubble plate 213. An etching solution-supplying line 218, through which the etching solution is supplied from a compound mixture tank 217, is connected to the bottom of the bath 211. The etching solution 226 used in the glass substrate 221 etching process is vented to a filter 219 through an etching solution-venting line 228 and then stored in a buffer tank 222 after eliminating impurities by the filter 219. The filtered etching solution stored in the buffer tank 222 is supplied to the compound mixture tank 217, and mixed with deionized water (DI) and hydrofluoric acid (HF), which are supplied from DI-supplying part 223 and HF-supplying part 224, respectively. A concentration-measuring equipment 225 installed in the compound mixture tank 217 measures the concentration of the mixed solution. If the concentration reaches the predetermined standard concentration, the supplies of DI and HF are stopped. The standard concentration has a range of about 1~50%. Furthermore, to keep a constant temperature of the mixed solution, a pressured cooling water (PCW) line (not shown) is installed in the compound mixture tank 217. The etching solution mixed in the compound mixture tank 217 is supplied to the interior of the bath 211 by a pump 227.

To measure a temperature change resulting from exothermic reaction between the substrate and the etching solution, a temperature-measuring equipment 229 is installed in the bath 211 and the substrate is etched according to the temperature change, for example, a thickness of about 1.4 mm of the substrate can become about 0.5 mm by this etching process. The temperature is determined by the following equation and the etching process is terminated in case of reaching a final temperature.

$$T_f = T_i + (K_r \cdot N \cdot \Delta t_2)/m,$$

($T_f$: final temperature, $T_i$: initial temperature, $K_r$: reaction constant, N number of substrates, $\Delta t_2$: desired thickness for etching, m: concentration of etching solution)

In an embodiment according to the present invention, a liquid crystal material can be injected into the attached substrates before or after the substrate etching process.

Consequently, in an embodiment according to the present invention, damage of the main seal pattern from the etching solution during the substrate etching process is prevented by the formation of the sub-seal patterns in the exterior of the main seal pattern, and air of the cell interior is easily vented due to the air vent portion having a proper seal pattern for ventilation. Therefore, the yields of the unit liquid crystal cells are increased.

It will be apparent to those skilled in the art that various modifications and variations can be made in the method of manufacturing a flat panel display device of the present invention without departing from the spirit or scope of the invention. Thus, it is intended that the present invention cover the modifications and variations of this invention provided they come within the scope of the appended claims and their equivalents.

What is claimed is:

1. A seal pattern of a liquid crystal display device, comprising:
    a substrate having a plurality of unit cell regions;
    a plurality of main seal patterns on the substrate, each main seal pattern being formed at a boundary of each corresponding unit cell region except for one unit cell region wherein no main seal pattern is formed at any of a boundary of the one unit cell region;
    a first sub-seal pattern surrounding all of the main seal patterns and having a plurality of open portions; and
    a plurality of additional seal patterns at the open portion.

2. The seal pattern according to claim 1, wherein the unit cell regions are arranged with one of a plurality of columns and a plurality of rows.

3. The seal pattern according to claim 2, wherein the main seal pattern is formed at a boundary of the one of a plurality of columns and a plurality of rows.

4. The seal pattern according to claim 1, further comprising a second sub-seal pattern between the unit cell regions.

5. The seal pattern according to claim 1, wherein the open portions are in the unit cell region having no main seal pattern.

6. The seal pattern according to claim 1, wherein the additional seal patterns vent air in the unit cell region.

7. A method of forming a seal pattern of liquid crystal display device, comprising:
    preparing a substrate having a plurality of unit cell regions;
    forming a plurality of main seal patterns on the substrate, each main seal pattern being disposed at a boundary of each corresponding unit cell region except for one unit cell region wherein no main seal pattern is formed at any of a boundary of the one unit cell region;

forming a first sub-seal pattern surrounding all of the main seal patterns and having a plurality of open portions; and forming a plurality of additional seal patterns at the open portion.

8. The method according to claim 7, wherein the unit cell regions are arranged with one of a plurality of columns and a plurality of rows.

9. The method according to claim 8, wherein the main seal pattern is formed at a boundary of the one of a plurality of columns and a plurality of rows.

10. The method according to claim 7, further comprising forming a second sub-seal pattern between the unit cell regions.

11. The method according to claim 7, wherein the open portions are in the unit cell region having no main seal pattern.

12. The method according to claim 7, wherein the additional seal pattern vent an air in the unit cell region.

13. The method according to claim 7, further comprising etching the substrate using an etchant.

14. The method according to claim 13, wherein the etchant is hydrofluoric acid.

15. A seal pattern of a liquid crystal display device, comprising:

a glass substrate having a plurality of unit cell regions;

a plurality of main seal patterns on the substrate, each main seal pattern being formed at a boundary of each corresponding one of the unit cell regions except for at least one middle unit cell region wherein no main seal pattern is formed at any of a boundary of the one unit cell region;

a plurality of injection holes each formed at a lower center portion of a corresponding main seal pattern;

a first sub-seal pattern surrounding all of the main seal patterns and having a plurality of air vent portions;

a plurality of additional seal patterns for air ventilation each formed at a corresponding air vent portion; and a second sub-seal pattern having a plurality of open portions.

16. The seal pattern according to claim 15, wherein the number of unit cell regions is at least 3.

17. The seal pattern according to claim 15, wherein the width of the plurality of seal patterns for air ventilation is about 1.5 to 2 mm.

18. The seal pattern according to claim 15, wherein the length of the plurality of seal patterns for air ventilation is about 70 to 100 mm.

19. The seal pattern according to claim 15, wherein the air vent portions are disposed on at least two inner sides of the at least one middle unit cell region.

20. A method of forming a seal pattern of liquid crystal display device, comprising:

preparing a glass substrate having a plurality of unit cell regions;

forming a plurality of main seal patterns on the substrate, each main seal pattern being disposed at a boundary of each corresponding unit cell region except for one middle unit cell region wherein no main seal pattern is formed at any of a boundary of the one unit cell region;

forming a first sub-seal pattern surrounding all of the main seal patterns and having a plurality of air vent portions;

forming a plurality of additional seal patterns for air ventilation at each corresponding air vent portion; and forming a second sub-seal pattern having a plurality of open portions.

* * * * *